(12) United States Patent
Hendry et al.

(10) Patent No.: US 7,899,941 B2
(45) Date of Patent: Mar. 1, 2011

(54) DISPLAYPORT I²C SPEED CONTROL

(75) Inventors: Ian Hendry, San Jose, CA (US); George C. Kyriazis, Cupertino, CA (US); Colin Whitby-Strevens, Ben Lomond, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 12/242,825

(22) Filed: Sep. 30, 2008

(65) Prior Publication Data

US 2010/0082859 A1    Apr. 1, 2010

(51) Int. Cl.
G06F 3/00       (2006.01)
G06F 13/14     (2006.01)

(52) U.S. Cl. .............................. 710/1; 710/107; 710/305
(58) Field of Classification Search .................. 710/1–8, 710/36–38, 105–116, 305–313
See application file for complete search history.

(56) References Cited

U.S. PATENT DOCUMENTS

| | | | |
|---|---|---|---|
| 5,465,333 A * | 11/1995 | Olnowich | 710/300 |
| 5,774,703 A * | 6/1998 | Weiss et al. | 713/501 |
| 5,815,734 A * | 9/1998 | Lee et al. | 710/60 |
| 6,209,042 B1 * | 3/2001 | Yanagisawa et al. | 710/3 |
| 6,233,637 B1 * | 5/2001 | Smyers et al. | 710/311 |
| 6,240,480 B1 * | 5/2001 | Wong et al. | 710/311 |
| 6,738,856 B1 * | 5/2004 | Milley et al. | 710/315 |
| 6,859,884 B1 * | 2/2005 | Sullam | 713/322 |
| 7,035,956 B2 * | 4/2006 | Tanaka | 710/306 |
| 7,167,996 B2 * | 1/2007 | Takahashi et al. | 713/600 |
| 2005/0223132 A1 * | 10/2005 | Toda | 710/22 |
| 2007/0067544 A1 * | 3/2007 | Isani et al. | 710/308 |
| 2007/0106959 A1 * | 5/2007 | McGowan | 715/848 |
| 2008/0250184 A1 * | 10/2008 | Sheafor et al. | 710/306 |
| 2010/0082859 A1 * | 4/2010 | Hendry et al. | 710/60 |

* cited by examiner

*Primary Examiner* — Christopher B Shin
(74) *Attorney, Agent, or Firm* — Townsend and Townsend and Crew LLP (57) ABSTRACT

Circuits, methods, and apparatus that allow a DisplayPort compatible host device to control data transactions over an I²C bus when communicating with a legacy monitor. One example includes an adapter having a compatibility register that may have a number of locations, where at least some of the locations correspond to I²C bus speeds. Values stored at these locations can indicate whether the adapter is compatible or incompatible with the corresponding I²C bus speed. Another example includes an adapter having a speed register that may have a number of locations, where at least some of the locations correspond to I²C bus speeds. A defined value written to one of these locations dictates the corresponding I²C bus speed.

26 Claims, 6 Drawing Sheets

1. Host reads capability register to determine possible speeds for I2C bus.

2. Host instructs adapter to operate I2C bus at first speed in the possible speeds by writing to speed register.

3. Host attempts to access EDID.

4. Host examines response from EDID, if any.

5. If response acceptable, no change needed.

6. If response unacceptable, host makes change to timing.

7. Host may change speed by instructing adapter to operate I2C bus at second speed in the possible speeds by writing to speed register, or host may change instruction rate or other timing parameter.

| b7 | b6 | b5 | b4 | b3 | b2 | b1 | b0 |
|----|----|----|----|----|----|----|----|
| 0  | 0  | 0  | 0  | 1  | 1  | 1  | 0  |

↑ 310    ↑ 320

330 →

Definitions:

b0 = 1Kbps
b1 = 3Kbps
b2 = 10Kbps
b3 = 100Kbps
b4 = 400Kbps
b5 = 1Mbps
b6 = Reserved
b7 = Reserved A device with these register entries can support I2C speeds of 3 to 100Kbps

Figure 3

| b7 | b6 | b5 | b4 | b3 | b2 | b1 | b0 |
|---|---|---|---|---|---|---|---|
| 0 | 0 | 0 | 0 | 1 | 1 | 1 | 0 |
| 0 | 0 | 0 | 0 | 1 | 0 | 0 | 0 |

1. The host writes a "1" to b3 to instruct the adapter to operate with an I2C bus rate of 100Kbps.

2. The host can write "1s" to all register locations to instruct the adapter to operate at it highest possible rate.

Definitions:

b0 = 1Kbps
b1 = 3Kbps
b2 = 10Kbps
b3 = 100Kbps
b4 = 400Kbps
b5 = 1Mbps
b6 = Reserved
b7 = Reserved

1. Host reads capability register to determine possible speeds for I2C bus.

2. Host instructs adapter to operate I2C bus at first speed in the possible speeds by writing to speed register.

3. Host attempts to access EDID.

4. Host examines response from EDID, if any.

5. If response acceptable, no change needed.

6. If response unacceptable, host makes change to timing.

7. Host may change speed by instructing adapter to operate I2C bus at second speed in the possible speeds by writing to speed register, or host may change instruction rate or other timing parameter.

DISPLAYPORT I²C SPEED CONTROL

BACKGROUND

Computer display systems have advanced a tremendous amount since the days of the simple cathode-ray tube monitor. New flat panel displays have a myriad of capabilities and can support a wide range of resolutions and refresh rates. They are being driven by signals compliant with new standards, such as DisplayPort, and other new standards that are currently being developed or will be developed are sure to follow.

Often a new host computer, such as a laptop or desktop computer, having these advanced capabilities needs to communicate with an older display, referred to as a legacy display. These legacy displays may be Video Graphics Array (VGA) or Digital Visual Interface (DVI) displays.

A DisplayPort device communicates device information over a differential auxiliary channel, while a VGA device communicates device information over an I²C bus. An adapter can be used to translate DisplayPort signals used by a host to VGA or DVI signals used by these legacy displays. This means the adapter needs to be able to receive a DisplayPort instruction from the host and translate it into an I²C compatible instruction, as well as receive I²C data and translate it into DisplayPort data for the host.

There are at least two aspects to the timing involved in translating DisplayPort auxiliary signals to VGA or DVI I²C signals. First, since the host acts as the master, it issues instructions at a certain rate. These instructions are translated by the adapter and passed to the display, which is the slave. If these instructions issue at a rate that is incompatible with I²C display circuitry, the host may not be able to retrieve needed data from the display. Second, the bus speeds between the DisplayPort auxiliary channel and the I²C bus are often incompatible. Typically, the DisplayPort auxiliary channel speeds are higher than the I²C bus speed. If the adapter provides instructions using an incompatible bus rate, the host may not be able to retrieve needed data from the display.

Thus, what is needed are circuits, methods, and apparatus that allow a DisplayPort compatible host device to control data transactions over an I²C bus when communicating with a legacy monitor.

SUMMARY

Accordingly, embodiments of the present invention provide circuits, methods, and apparatus that allow a DisplayPort compatible host device to control the timing and data rate or speed of data transactions executed by an adapter over an I²C bus when communicating with a legacy monitor.

An exemplary embodiment of the present invention improves a system having a DisplayPort compatible host driving a legacy display via an adapter. To properly drive the legacy display, the host reads information from extended display identification data (EDID) circuitry located on the display. Specifically, instructions from the host are received by the adapter over an auxiliary channel and provided by the adapter to the display over an I²C bus. Data retrieved from the EDID circuitry is received by the adapter on the I²C bus and provided by the adapter as an auxiliary channel signal to the host.

In this exemplary embodiment of the present invention, the host acts as the bus master, and can thus control the rate at which instructions are provided to the EDID circuitry over the I²C bus. This aspect of the I²C bus timing can be adjusted by controller software running on the host device.

Also in this exemplary embodiment of the present invention, the host can determine a set of one or more possible speeds at which the adapter can communicate over the I²C bus. In a specific embodiment of the present invention, this is done by the host reading values from a register on the adapter. This register may be referred to as a compatibility register and it may have a number of locations, where at least some of the locations correspond to I²C bus speeds. Values stored at these locations can indicate whether the adapter is compatible or incompatible with the corresponding I²C bus speed.

In another exemplary embodiment of the present invention, the host can dictate a speed at which the adapter communicates over the I²C bus. In a specific embodiment of the present invention, this is done by the host writing a value to a register on the adapter. This register may be referred to as a speed register and it may have a number of locations, where at least some of the locations correspond to I²C bus speeds. A defined value, such as a "1," written to one of these locations dictates the corresponding I²C bus speed.

In another embodiment of the present invention, the host can write all "1s" to the speed register locations. In this case, the adapter can operate at its highest speed. This enables the host to avoid having to read the capability register in the adapter before beginning transactions. In other embodiments the present invention, the host may write more than one "1" to the speed register locations. In this case, the adapter can drive the I²C bus at the highest speed that the adapter is capable of, from among those speeds identified by the host.

In another exemplary embodiment of the present invention, if the host is not able to properly read data from EDID circuitry over an I²C bus, one or more of these timing parameters may be changed by the controller software running on the host. For example, the host may change the rate at which it issues commands. Also, the host may change the I²C bus rate. This may be done by writing a new value to the speed register in the adapter.

In another exemplary embodiment of the present invention, the compatibility and speed registers are DisplayPort control and data registers located in the adapter. The compatibility register may be a read-only register. This register may be formed by hard-wired connections, fuses, or in other ways. The speed register can be a read-write memory or register. It may be either volatile or nonvolatile.

Various embodiments of the present invention may incorporate one or more of these and the other features described herein. A better understanding of the nature and advantages of the present invention may be gained by reference to the following detailed description and the accompanying drawings.

DESCRIPTION OF EXEMPLARY EMBODIMENTS

Figure 1:
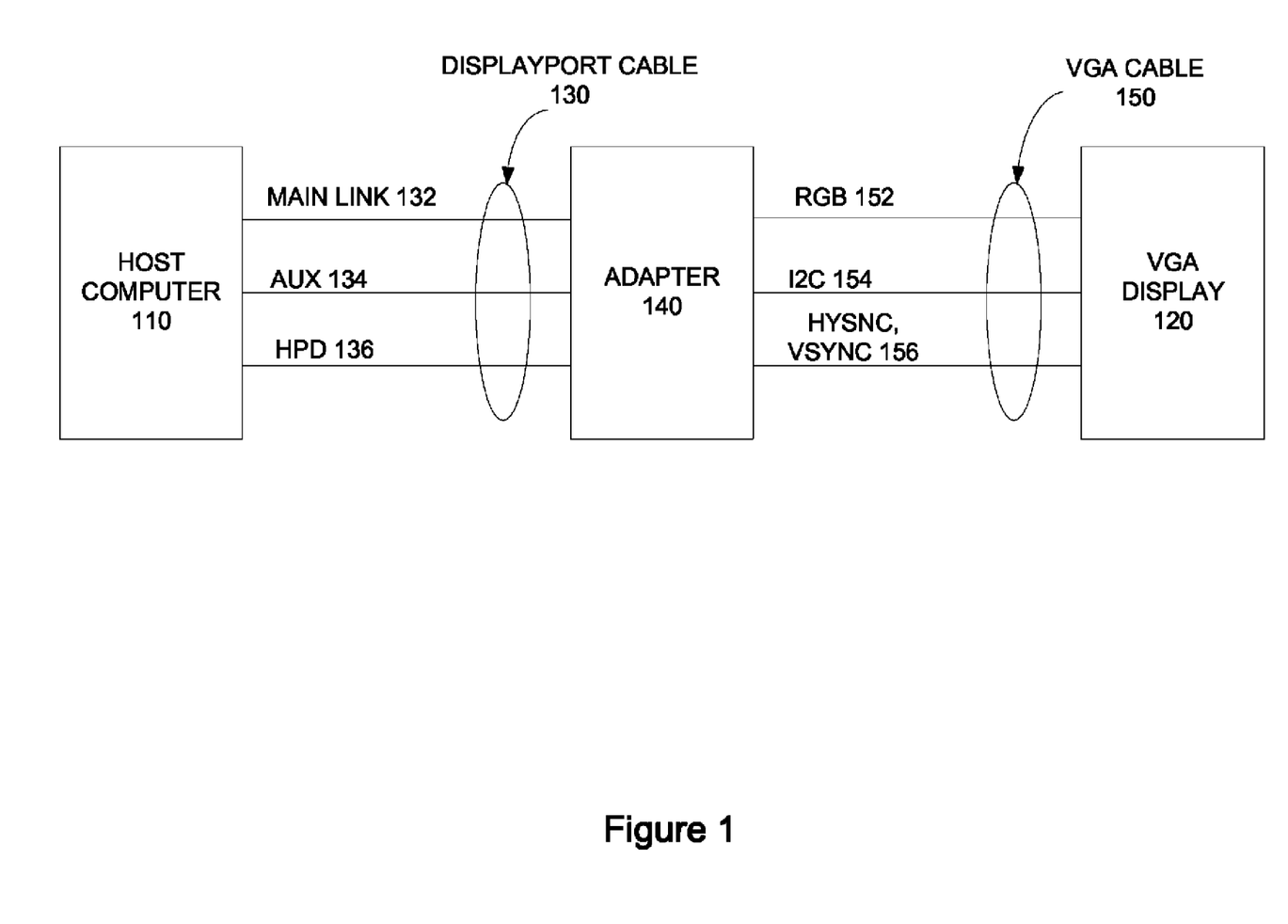
FIG. 1 illustrates a display system that is improved by the incorporation of an embodiment of the present invention.

FIG. 1 illustrates a display system that is improved by the incorporation of an embodiment present invention. This figure includes a host computer 110 communicating with an adapter 140 over a DisplayPort cable 130. The adapter 140 in turn communicates with a legacy display 120 over a legacy cable 150. In this specific example, the legacy display 120 and legacy cable 150 are a VGA display and a VGA cable. In other embodiments of the present invention, the display 120 and cable 150 can be a DVI display and cable, or they may be compliant with other standard or proprietary signaling technology. In other examples, the adapter 140 may drive more than one display. This figure, as with the other included figures, is shown for illustrative purposes and does not limit either the possible embodiments of the present invention or the claims.

The host computer 110 communicates with the adapter 140 over a DisplayPort cable 130, which includes lines for a main link 132, auxiliary channel 134, and hot-plug detect 136. The adapter 140 communicates in turn with in the legacy VGA display 120 over VGA cable 150. VGA cable 150 includes RGB lines and their respective returns 152, $I^2C$ bus 154, and horizontal sync and vertical sync lines 156.

Graphics information is provided by the host computer 110, typically using a graphics processor (not shown) to a display 120 via the adapter 140, using the main link 132. The main link 132 may utilize one or more lanes of data. Specifically, one, two, or four lanes of data may convey graphics information from the host computer 110 to the adapter 140. The adapter 140 provides RGB data to the display 120.

The $I^2C$ bus 154 is used to convey support information between the display 120 and the adapter 140. Auxiliary channel 134 is used to convey support information between the adapter 140 and the host 110. The hot-plug detect line 136 is used to inform the host computer 110 when a display 120 is connected or disconnected.

In this example, a host computer 110 provides graphics data to the display 120. In other embodiments of the present invention, other devices, such as set-top boxes, satellite receivers, and other systems, may provide the graphics information to the display 120. Also, while this and the other systems are shown as including DisplayPort devices and cables, embodiments of the present invention may be used to improve other types of systems that are currently available, are currently being developed, or will be developed in the future.

In this and the other included examples, the host 110 may be a laptop or notebook computer. The adapter 140 may be a dongle connected to the host computer 110 through a cable 130. The host computer 110 may include a DisplayPort connector to accept the cable 130. The dongle or adapter 140 may receive its power from the host computer 110. The dongle may include on or more connectors to connect to one or more displays, as well as translating circuitry for converting DisplayPort signals to signals compliant with VGA, DVI, or other video standard or proprietary technologies. These one or more connectors may be DisplayPort, VGA, DVI, or other types of connectors to connect to a compatible display via an appropriate cable.

In some circumstances, it may be desirable for a display to be remote from a computer. This may be the case in public venues, elevators, and other circumstances. In such a situation, the adapter 140, also know as a branch device, may be used to transmit graphics data over a distance. In other circumstances, it may be desirable to use more than one display in a display system. This may be the case in a workstation environment. In such a situation, a branch device may be used to provide data to more than one display.

At power-up, reset, or other times, the host 110 may need to determine information regarding the display 120, such as resolution, refresh rate, and other such information. This data is often stored in a circuitry on the display known as extended display identification data circuitry. Reading these extended display identification data circuits allow a host computer to determine a display's capabilities.

However, the host in this example is a DisplayPort device, while the display is a legacy display, specifically a VGA display. DisplayPort devices communicate support information using an auxiliary channel. The EDID circuitry communicates using an $I^2C$ bus. Since the host 110 communicates over the auxiliary channel 134 and the display EDID communicates using the $I^2C$ bus 154, the adapter 140 can include an auxiliary-to-$I^2C$ translator 210 to facilitate communication between the host 110 and display 120. An example of a display system that includes these translator and EDID circuits is shown in the following figure.

Figure 2:
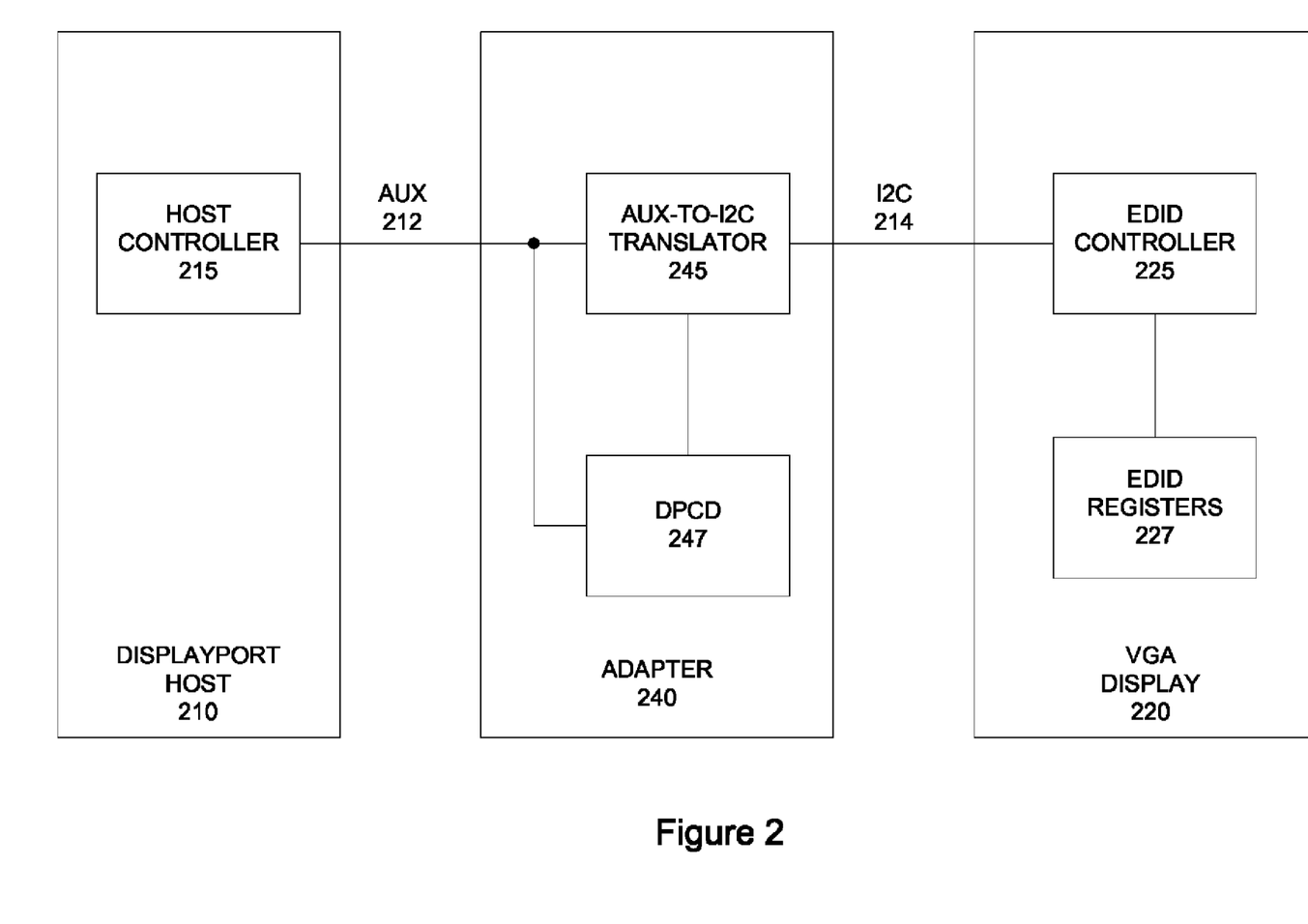
FIG. 2 illustrates a display system according to an embodiment of the present invention.

FIG. 2 illustrates a portion of a display system according to an embodiment of the present invention. This figure includes a host 210 that includes a host controller 215, an adapter 240 that includes an auxiliary-to-$I^2C$ translator 245 and DisplayPort control and data registers 247, and a display 220 that includes an extended display identification data controller 225 and extended display identification data registers 227.

The host 210 includes a host controller 215 that communicates system information over an auxiliary channel 212. The adapter 240 includes an auxiliary-to-$I^2C$ translator 245 that receives and provides auxiliary channel signals on lines 212 and provides and receives $I^2C$ signals on lines 214. The DisplayPort control and data registers 247 may be accessed by the host controller 215. The auxiliary-to-$I^2C$ translator 245 can access information from the DisplayPort control and data registers 247. The information in these registers can be used to instruct the auxiliary-to-$I^2C$ translator 245 regarding how to communicate with the extended display identification data controller 225 over the $I^2C$ bus 214.

The auxiliary-to-$I^2C$ translator 225 provides and receives auxiliary channel signals on lines 212 and provides and receives $I^2C$ signals on lines 214. Specifically, the auxiliary channel signals on lines 212 employ a tunneling protocol, that is, $I^2C$ signals are sent using auxiliary channel compatible signaling. Again, the extended display identification data controller 225 provides information regarding supported resolutions, refresh rates, as well as other information. The extended display identification data circuitry 225 may also employ extended display identification data registers 227. These registers may store information such as display settings including brightness, speaker volume, and other information.

The adapter 240 also includes DisplayPort control and data registers 247. These registers are specific to DisplayPort, therefore they are connected to the auxiliary data input 212 rather than the $I^2C$ bus 214. These registers may include information regarding the manufacture and model, chip identification and revision information, as well as information regarding software and firmware revisions. Information regarding the source or host devices, sink or display devices, and branches or adapters, may be included.

The display 220 includes an extended display identification data controller 225 that communicates with the adapter over the $I^2C$ bus 214. The extended display identification data controller 225 can store and retrieve information from the extended display identification data registers 227.

Commands to read data from the extended display identification data registers 227 are initiated by the host controller 215, translated to I²C signals by the adapter, and provided to the display. Similarly, responses generated by the extended display identification controller 225 are provided to the adapter 240, which translates them to auxiliary channel signals on lines 212 and sends them to the host 210. During communications between the adapter 240 and display 220 over the I²C bus 214, the adapter 240 translates for the host, which is the bus master, and the display 220, which acts as the slave. The extended display identification controller 225 may be implemented as a hardware circuit or as software. Accordingly, various extended display identification controllers 225 may operate at different rates. Thus, the host 210 may need to adjust the timing of instructions sent to the display 220. This adjustment may include adjusting the rate at which commands are sent, as well as the data rate or speed of the I²C bus 214.

In practical systems, the host controller 215 includes software needed for communicating with the extended display identification data controller 225. The host controller 215 software may implement various algorithms to adjust the timing of instructions sent by the host 210 as well as the data rate or speed at which data is communicated over the I²C bus 214. In an exemplary embodiment of the present invention, the host 210 reads data from the adapter 240 to determine the speeds at which the auxiliary-to-I²C translator 245 can provide signals over the I²C bus 214. In a specific embodiment of the present invention, this is done by providing data in a register in the DisplayPort control and data registers 247. An example is shown in the following figure.

Figure 3:
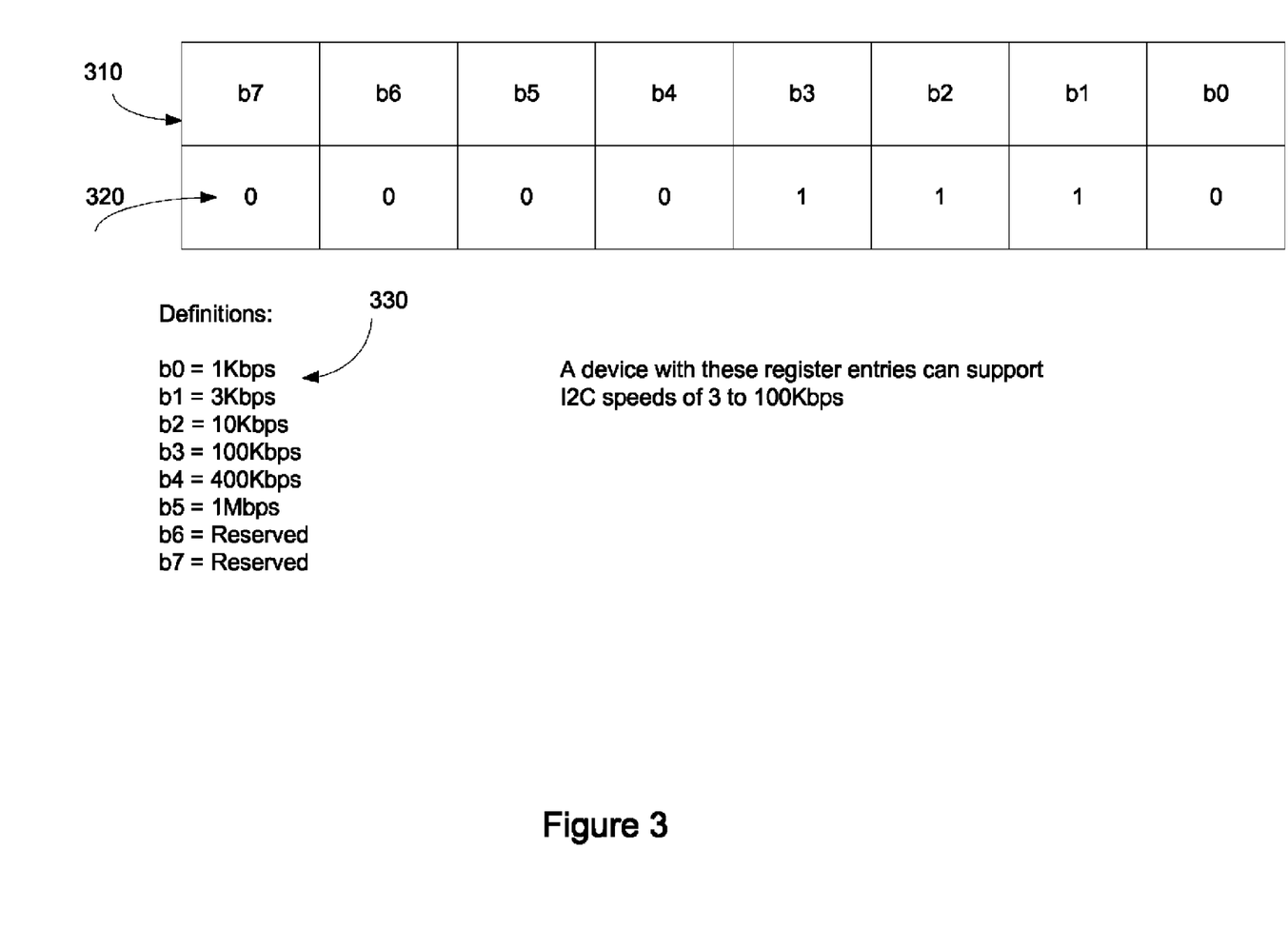
FIG. 3 illustrates a capability register in a DisplayPort control and data register bank according to an embodiment of the present invention.

FIG. 3 illustrates a capability register in a DisplayPort control and data register bank according to an embodiment of the present invention. This figure includes a register 310 having a number of locations 320. The data in the locations 320 may be written to or they may be read-only, that is, they may have fixed or hardwired values. Definitions 330 are included for an exemplary embodiment of the present invention. In this example, the adapter is capable at operating over the I²C bus at each rate identified by a "1" in the register 310. In the given example, the adapter can operate at I²C speeds of three to 100 Kb per second. Speed values of 1, 3, 10, 100, 400, and 1000 Kb per second may be identified using this register. In other embodiments the present invention, more or fewer register locations may be available, and the corresponding speeds may vary.

Again, this information informs the host of the speeds that the adapter is capable of operating over the I²C bus. In various embodiments the present invention, the host may want to control the speed at which the adapter actually operates. Accordingly, embodiments of the present invention provide a second register that may be written to. An example is shown in the following figure.

Figure 4:
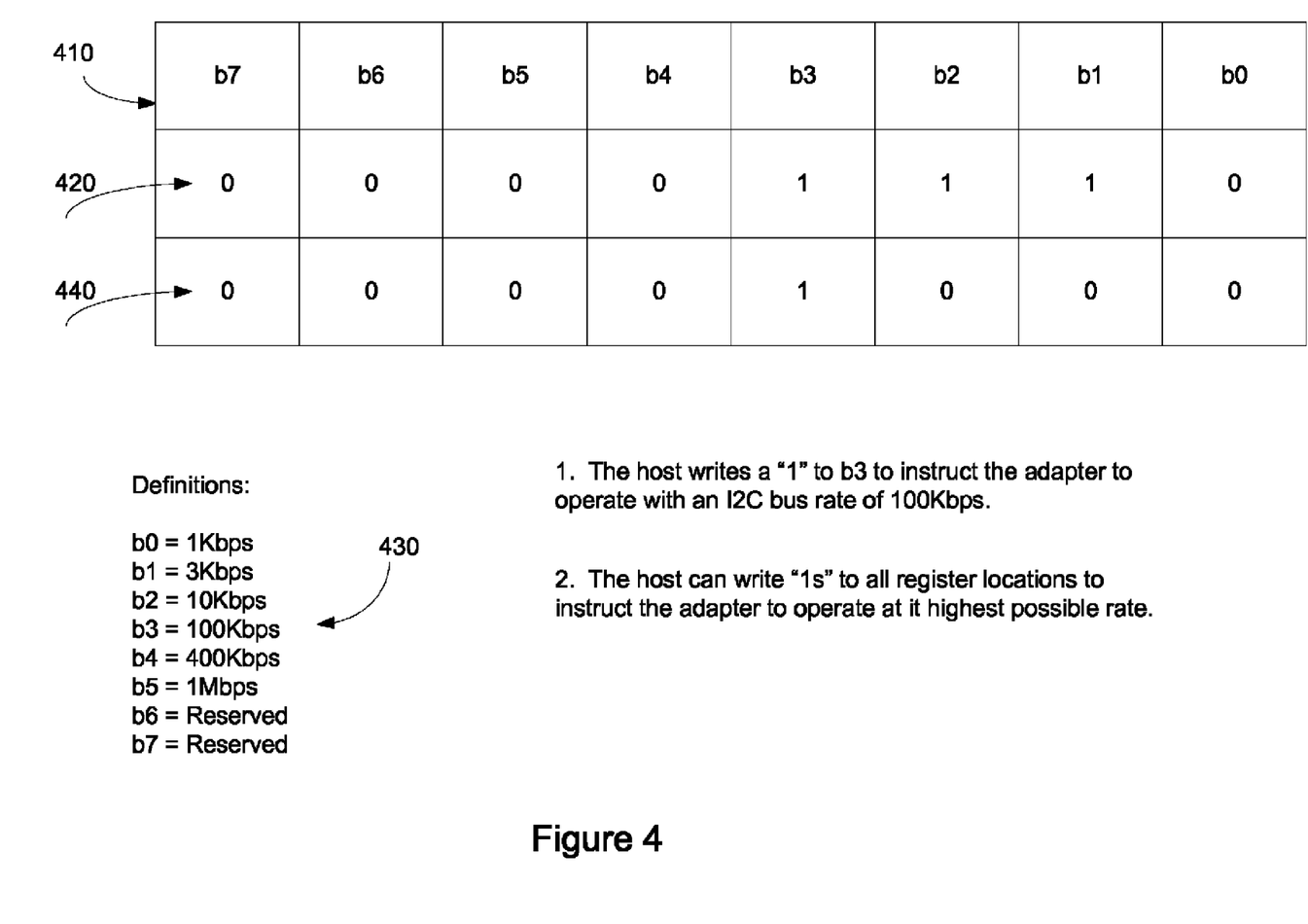
FIG. 4 illustrates capability and speed registers in a DisplayPort control and data register bank according to an embodiment of the present invention.

FIG. 4 illustrates capability and speed registers in a DisplayPort control and data register bank according to an embodiment of the present invention. These registers have locations 420 and 440. Again, the registers 420 are typically read-only, and inform the host as to the available speeds the I²C bus. The register 440 can be written to by the host. The location the host writes to identifies the I²C bus speed at which the adapter should operate.

Again, in this example, the adapter may operate the I²C bus at a rate of three to 100 Kb per second, and the host writes a value of "1" to a location in the register 440, instructing the adapter to operate at a rate of 100 kb per second. The adapter will use this bus speed until instructed by the host to use another speed.

In a specific embodiment of the present invention, the host can write all "1s" to the register locations 440. In this case, the adapter can operate at its highest speed. This enables the host to avoid having to read the capability register in the adapter, at least initially. If the highest speed of the adapter does not work, the host can then change the instruction timing or bus speed by writing a value to a specific register location.

In other embodiments the present invention, the host may write more than one "1" to the register locations 440. In this case, the adapter can operate at the highest speed identified by the host that the adapter is capable of operating at. For example, if the adapter is capable of operating at three to 100 Kbps, if 3 and 10 Kbps are identified by the host, the adapter can then operate at 10 Kbps. An example of the operation of these registers is shown the following figure.

Figure 5:
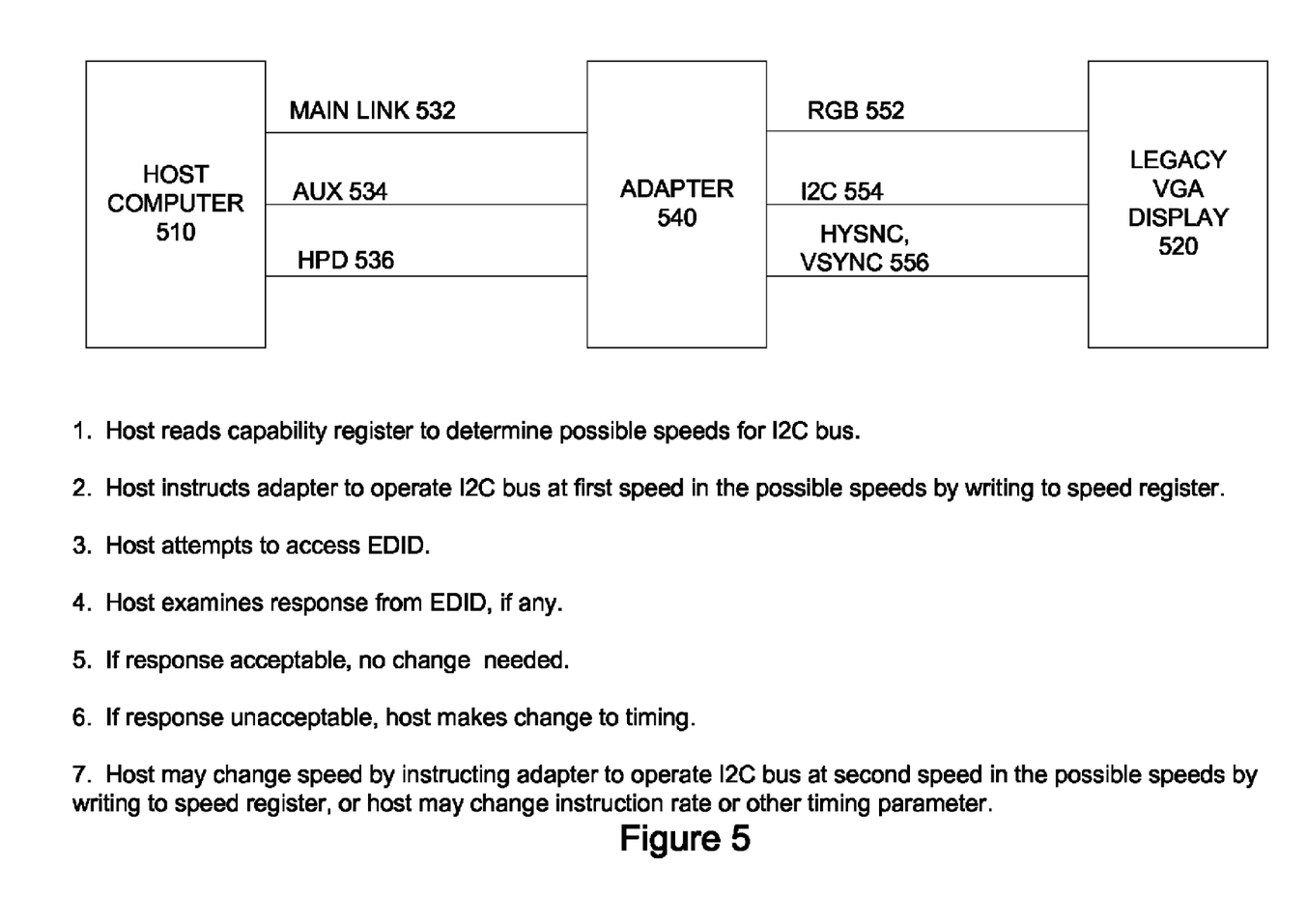
FIG. 5 illustrates transactions in a display system according to an embodiment of the present invention.

FIG. 5 illustrates transactions in a display system according to an embodiment of the present invention. Initially, the host 510 reads capability registers in the adapter 540 in order to determine the possible speeds for an I²C bus. The host then instructs the adapter to operate the I²C bus at a first speed in the set of possible speeds. This is done by writing to a speed register in the DisplayPort control data register in the adapter 540. The host can then attempt to access the extended display identification data circuitry in the VGA display 520. The host can then examine the response from the display 520, if any. The host can then follow an algorithm to determine if the response is acceptable. If the response is acceptable, then no change is needed in the I²C timing. If the response is unacceptable, the host can make changes to the timing. Specifically, the host may change the speed of the I²C bus by writing a new value to the speed register in the DisplayPort control and data registers in the adapter 540. Alternately, the host may change the instruction timing, for example, the gap time between commands provided by the host, or other such timing. A flowchart illustrating this shown the following figure.

Figure 6:
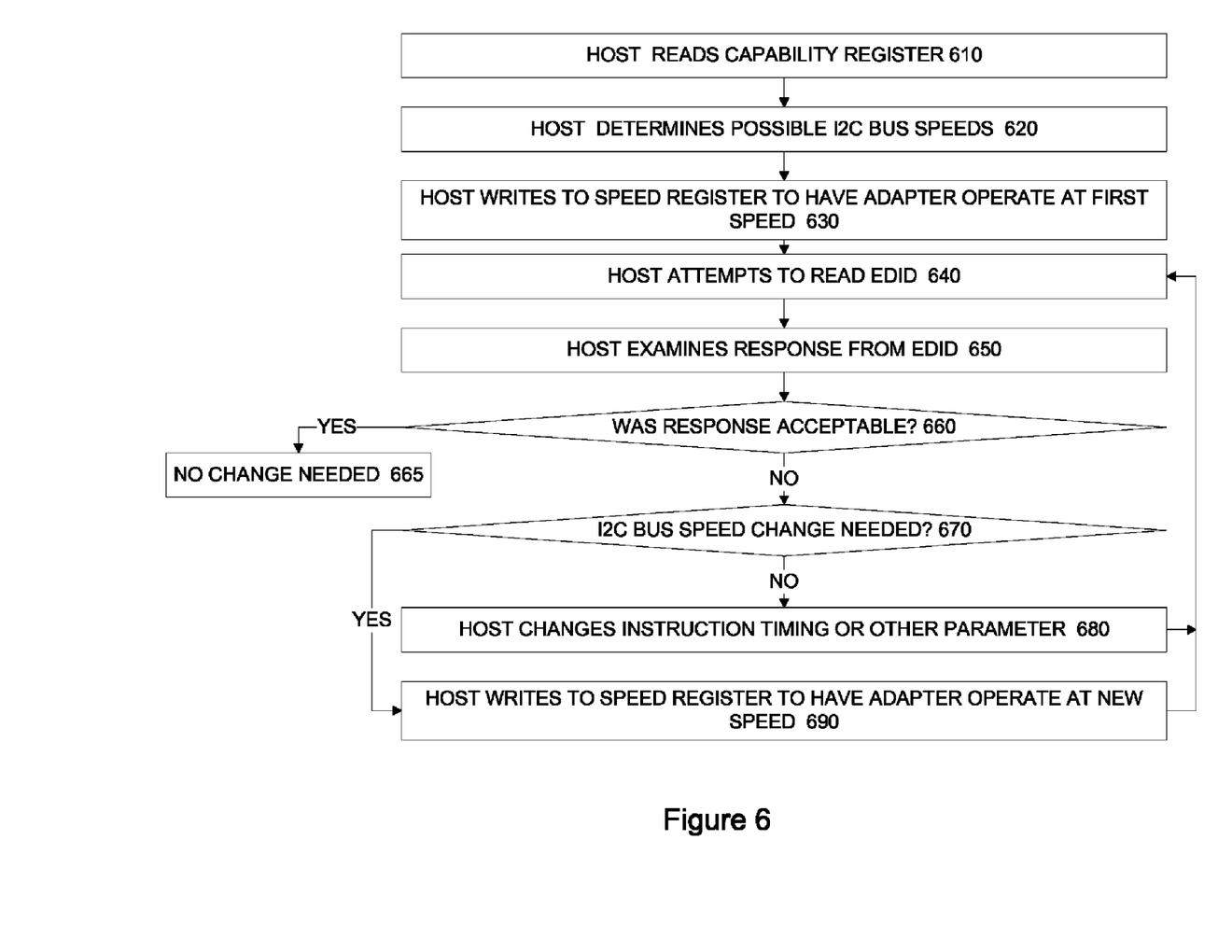
FIG. 6 is a flowchart of a method of setting a speed for an I²C bus according to an embodiment of the present invention.

FIG. 6 is a flowchart of a method of setting a speed for an I²C bus according to an embodiment of the present invention. In act 610, the host reads a capability register in the DisplayPort control and data registers in an adapter. In act 620, the host determines the possible I²C bus speeds at which the adapter can operate. The host then writes to the speed register in the DisplayPort control and data registers in the adapter instructing the adapter to operate at a first speed. The host can then attempt to read data from the extended display identification data circuitry in the display in act 640. The host then examines the response in act 650. A determination of whether the response was correct is made in act 660. If the response was correct, no change is needed, as shown in act 665. If the response is not acceptable, it is determined whether instruction rate or the I²C bus speed needs to be changed in act 670. If the I²C bus speed should be changed, the host can write a new value to the speed register in act 690, otherwise other timing parameters are changed in act 680.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method of controlling a speed of a first bus comprising:
   with a first device that is coupled to a second device over a second bus:

reading values from locations in a first register, the first register located on the second device, wherein each of the locations in the first register identifies a speed at which the second device can communicate over the first bus;

writing a value to a first location in a second register, the second register located on the second device, wherein the value in the first location in the second register identifies a first speed at which the second device is to communicate over the first bus; and receiving communications at the first speed from the second device over the first bus.

2. The method of claim 1 further comprising:
determining that the speed of the first bus needs to be changed; and
writing a value to a second location in the second register, wherein the value in the second location in the second register identifies a second speed at which the second device is to communicate over the first bus.

3. The method of claim 2 wherein the first device is a host computer and the second device is an adapter.

4. The method of claim 1 wherein the first bus is an I2C bus.

5. The method of claim 4 wherein the second bus is a DisplayPort auxiliary bus.

6. The method of claim 4 wherein the I2C bus couples the second device to a display.

7. The method of claim 6 wherein the display is a VGA display.

8. A method of controlling a speed of a first bus comprising:
with a first device coupled to a second device over a second bus:
receiving a first command to provide values stored in a first register on the first device to the second device, the values stored in the first register identifying speeds at which the first device can communicate over the first bus;
providing the values stored in the first register on the first device to the second device;
receiving a second command to write a value to a first location in a second register on the first device, the value written to the first location in the second register identifying a first speed at which the first device is to communicate over the first bus; and
communicating over the first bus at the first speed.

9. The method of claim 8 further comprising:
determining that the speed of the first bus needs to be changed; and
receiving a third command to write the value to a second location in the second register on the first device, the value written to a second location in the second register identifying a second speed at which the first device is to communicate over the first bus; and
communicating over the first bus at the second speed.

10. The method of claim 9 wherein the second device is a host computer and the first device is an adapter.

11. The method of claim 8 wherein the first bus is an I2C bus.

12. The method of claim 11 wherein the second bus is a DisplayPort auxiliary bus.

13. The method of claim 11 wherein the I2C bus couples the first device to a display.

14. The method of claim 13 wherein the display is a VGA display.

15. A display system comprising:
a host including a host controller;
an adapter coupled to the host over a first bus and including a first register and a second register; and
a display coupled to the adapter over a second bus and having an extended display identification data circuit,
wherein the host reads the first register to determine a set of possible speeds at which the adapter can communicate over the second bus,
wherein the host writes to the second register to instruct the adapter to communicate over the second bus at a first speed, and
wherein the adapter then communicates with the display at the first speed over the second bus.

16. The display system of claim 15 wherein the first bus is a DisplayPort bus.

17. The display system of claim 16 wherein the second bus is an I2C bus.

18. The display system of claim 17 wherein the first and second registers are DisplayPort control and data registers.

19. The display system of claim 15 wherein the first register is a read-only register.

20. The display system of claim 15 wherein the display is a VGA display.

21. The method of claim 1 further comprising:
with the second device:
communicating over the first bus at the first speed.

22. The method of claim 2 further comprising:
with the second device:
communicating over the first bus at the second speed.

23. An adapter comprising:
a first register readable using a first bus, wherein the content stored in the first register indicates speeds at which the adapter can communicate using a second bus; and
a second register writeable using the first bus, wherein the content stored in the second register indicates a speed at which the adapter is to communicate using the second bus.

24. The adapter of claim 23 wherein the second bus is an I2C bus.

25. The adapter of claim 24 wherein the first bus is a DisplayPort auxiliary bus.

26. The adapter of claim 24 wherein the I2C bus couples the adapter to a display.

* * * * *

UNITED STATES PATENT AND TRADEMARK OFFICE
CERTIFICATE OF CORRECTION

| | |
|---|---|
| PATENT NO. | : 7,899,941 B2 |
| APPLICATION NO. | : 12/242825 |
| DATED | : March 1, 2011 |
| INVENTOR(S) | : Ian Hendry et al. |

Page 1 of 1

It is certified that error appears in the above-identified patent and that said Letters Patent is hereby corrected as shown below:

On Sheet 4 of 6, Figure 4, line 8, delete "it" and insert -- its --, therefor.

In column 3, line 22, after "with" delete "in".

In column 3, line 55, delete "on" and insert -- one --, therefor.

In column 3, line 65, delete "know" and insert -- known --, therefor.

In column 8, line 51, in Claim 26, delete "12C" and insert -- I2C --, therefor.

Signed and Sealed this
Eleventh Day of September, 2012

David J. Kappos
*Director of the United States Patent and Trademark Office*